United States Patent [19]

Terpstra et al.

[11] Patent Number: 4,882,962
[45] Date of Patent: Nov. 28, 1989

[54] ANGULARLY ADJUSTABLE BAND SAW

[75] Inventors: Daniel A. Terpstra, St. Louis County; Steven H. Plume, St. Charles County, both of Mo.

[73] Assignee: Emerson Electric Co., St. Louis, Mo.

[21] Appl. No.: 234,156

[22] Filed: Aug. 19, 1988

[51] Int. Cl.⁴ .................... B23D 55/02; B27B 13/04
[52] U.S. Cl. .................................................. 83/812
[58] Field of Search ......................... 83/811, 812, 810

[56] References Cited

U.S. PATENT DOCUMENTS

| | | | |
|---|---|---|---|
| 442,420 | 12/1890 | Coan | 83/812 |
| 490,212 | 1/1893 | O'Connor | 83/812 |
| 814,652 | 3/1906 | Harrold et al. | 83/811 |
| 936,596 | 10/1909 | Anderson | 83/811 |
| 1,302,949 | 5/1919 | Meyers | 83/812 |
| 2,644,491 | 7/1953 | Abrahan | 83/811 |
| 2,711,196 | 6/1955 | Daniel | 83/811 |
| 2,744,547 | 5/1956 | Sevetz | 83/811 |
| 3,801,089 | 4/1974 | Fukugami et al. | 83/810 X |

Primary Examiner—Donald R. Schran
Attorney, Agent, or Firm—Polster, Polster and Lucchesi

[57] ABSTRACT

An angularly adjustable band saw is disclosed which provides the desired angular adjustment of an endless band saw blade relative to a workable surface for bevel and/or miter cutting of a workpiece. The worktable surface is part of a supporting worktable that includes a saw blade slot extending through the worktable surface. A frame support is fixed to the worktable below the worktable surface and a movable frame is operatively connected relative to the frame support. The movable frame includes an upper band saw supporting wheel above the worktable surface and a lower band saw supporting wheel below the worktable surface, with an endless band saw blade mounted for movement about the upper and lower band saw supporting wheels, including through the saw blade slot in the worktable surface. The movable frame, including its associated endless band saw blade, is adjustable relative to the frame support and the worktable to provide the desired angular adjustment of the endless band saw blade relative to the worktable surface for bevel and/or miter cutting of a workpiece.

17 Claims, 8 Drawing Sheets

ANGULARLY ADJUSTABLE BAND SAW

BACKGROUND OF THE INVENTION

The present invention relates an angularly adjustable band saw, and more particularly, to a band saw for angular adjustment/movement of an endless band saw blade relative to a worktable surface for bevel and/or miter cutting of a workpiece.

Band saws, with an endless band saw blade moving in a corresponding endless path, generally expose one moving cutting blade run or section for cutting workpieces. Typically, the exposed moving cutting blade run or section moves within a saw blade slot that extends through a worktable surface on which a workpiece rests. As the exposed moving cutting blade run or section continuously moves through the saw blade slot, the moving cutting teeth, incorporated in the endless band saw blade, engage and cut workpieces, as desired. Some of the customary band saw cutting operations include such straight line cutting operations as cross-cutting, ripping, mitering, beveling, compound cutting, and resawing. In addition, circle cutting and curve cutting are possible where the workpiece is fed in the desired curved cutting pattern to the moving endless saw blade.

For angular cutting operations that include beveling, mitering or compound cutting (simultaneous bevel and miter cutting operation), it has been customary for the worktable to be angularly adjusted or tilted relative to the endless band saw blade. While this has been relatively easy to achieve, it makes the operation of the band saw more difficult since the workpiece must be held on the angularly inclined or tilted worktable surface. As will be appreciated, the force of gravity works against the holding of the workpiece on the inclined or tilted worktable surface. In addition, where angularly inclined or tilting worktables have been used, the geometry involved has necessitated a relatively small worktable surface, to avoid unnecessary workpiece and band saw interference relative to the inclined or tilted worktable.

SUMMARY OF THE INVENTION

Among the several objects and advantages of the present invention include:

the provision of an angularly adjustable band saw which overcomes the aforenoted deficiencies of the prior art;

the provision of the aforementioned band saw which incorporates angular adjustment/movement of an endless band saw relative to a worktable surface for bevel, miter or compound cutting operations;

the provision of the aforementioned band saw which provides the desired angular adjustment of an endless saw blade relative to a worktable surface without changing the point of intersection of the saw blade relative to the worktable surface all of the foregoing taking place without movement of the worktable;

the provision of the aforementioned band saw which provides incremental angular adjustment of the band saw relative to a worktable surface;

the provision of the aforementioned band saw which includes upper and lower blade guide supports which are constructed and mounted for corresponding aligned adjustment during inclination or tilting of the band saw relative to the worktable surface;

the provision of the aforementioned band saw in which the lower blade guide support maintains its relative position during inclination of the band saw without operator adjustment;

the provision of the aforementioned band saw which enables a substantially larger worktable surface to be utilized then in prior art constructions and;

the provision of the aforementioned band saw which provides rapid and precise adjustment of the endless band saw relative to a worktable surface; maintains the band saw in the position desired; enables safe and efficient operation of the band saw; has a durable and long lasting construction, is made from a relatively minimum number of parts considering the nature of the apparatus; and is otherwise well adapted for the purposes intended.

Briefly stated, the band saw of the present invention includes a supporting worktable having a worktable surface on which a workpiece rests and a saw blade slot extending through the worktable surface. A frame support is fixed to the worktable below the worktable surface. A movable frame has an upper band saw supporting wheel positioned above the worktable surface and a lower band saw supporting wheel positioned below the worktable surface. An endless band saw blade is mounted for movement about the upper and lower band saw supporting wheels including through the saw blade slot in the worktable surface. Means are provided for driving one of the saw blade supporting wheels to operate the endless saw blade. Adjustment means are incorporated for adjusting the movable frame including associated endless band saw blade relative to the frame support and worktable to provide the desired angular adjustment of the endless band saw blade relative to a worktable surface for bevel and/or miter cutting of a workpiece.

The adjustment means includes spaced cooperating control means associated with the movable frame, frame support and worktable to provide the desired angular adjustment and includes a slidably supported element of the movable frame that is movable with respect to the support frame, with the movable frame also being slidably supportive relative to the worktable to provide the spaced cooperating control means for the desired angular adjustment. The slidable support element of the movable frame includes a complementary shaped element slidably supported within an elongated channel and also against the face of the frame support. The elongated channel is constructed to extend generally parallel to the worktable surface. The movable frame further is provided with a curvilinear slotted passageway spaced from the complementary shaped element and receiving a shaft connected to the frame support and base. The shaft is arranged to be positioned at various locations within the curvilinear slotted passageway to provide tilting movement of the movable frame and sliding movement of the complementary shaped surface thereof within the elongated channel of the frame support. In order to provide incremental angular adjustment, a gear segment may be mounted adjacent the curvilinear slotted passageway for cooperative engagement with a pinion gear mounted on the shaft.

For guiding the blade while limiting twisting thereof, upper and lower blade guide supports may be mounted on the movable frame above and below the worktable surface. The lower blade guide support may be slidably pivotally mounted to the frame support, with the movable frame being connected to the lower blade guide support for slidable pivotable movement, thereby enabling corresponding movement and alignment of the upper and lower blade guide supports relative to one another and to the movable frame and worktable during tilting movement of the movable frame relative to the worktable surface and frame support. The lower blade guide support may include a trunnion fixed to the worktable below the worktable surface with a curvilinear opening provided in the trunnion for slidable pivoting movement of an elongated generally vertically oriented sliding member also having an elongated opening therein. The movable frame includes a slide portion for slidable movement within the elongated opening of the elongated generally vertically oriented slide member during tilting movement of the movable frame to thereby cause angular movement of the slide member through slidable pivoting movement thereof. The lower blade guide support maintains its relative position during inclination of the band saw without operator adjustment.

Other and further objects and advantages of the present invention will become more apparent from the ensuing description.

BRIEF DESCRIPTION OF THE DRAWINGS

In the drawings.

Corresponding reference numerals will be used throughout the various figures of the drawings.

DESCRIPTION OF THE PREFERRED EMBODIMENT

Reference is now made to FIGS. 1-5 of the drawings which illustrate the fully assembled components of the angularly adjustable band saw 1; FIGS. 6-9 which depict by diagrammatic representation the angular adjustment of the band saw from 0° to 45°; and FIGS. 11-12 which are exploded isometric views showing in detail, the principal operating components of the angularly adjustable band saw 1 of the present invention.

Figure 1:
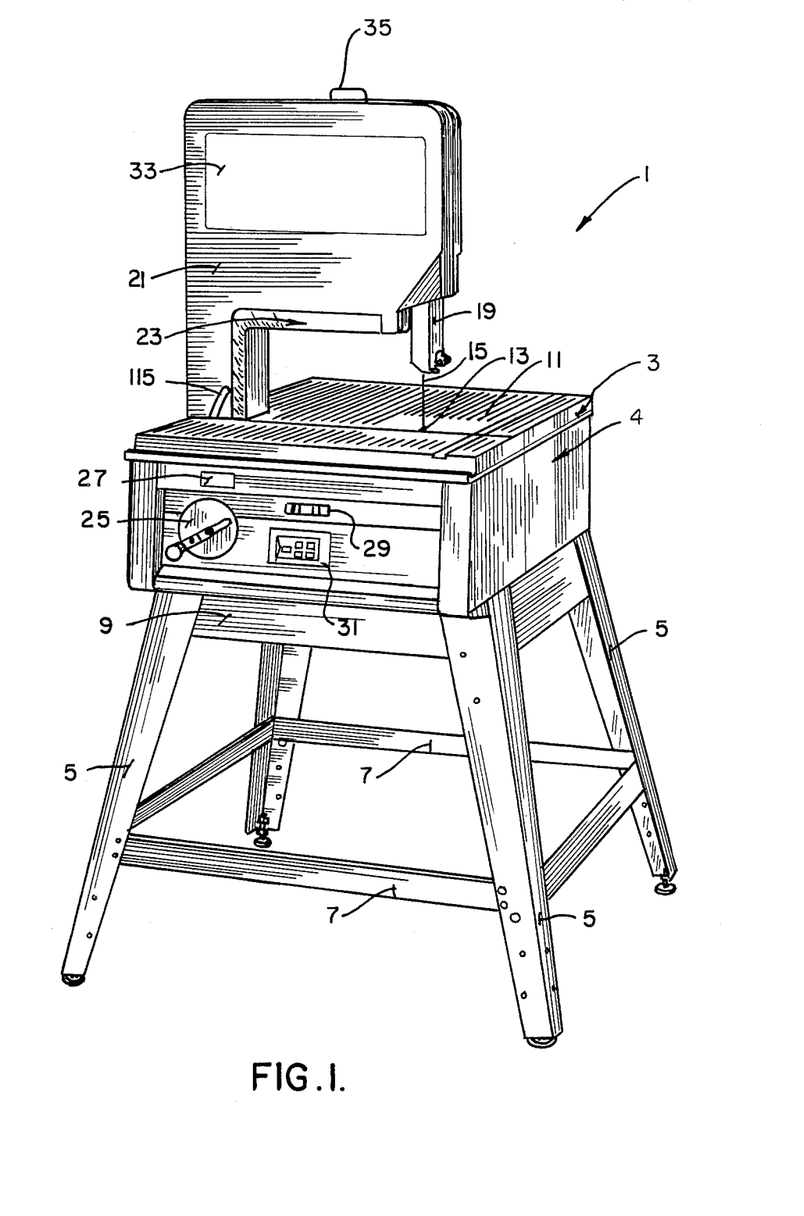
FIG. 1 is an isometric view of the angularly adjustable band saw which is constructed in accordance with the teachings of the present invention.
Figure 2:
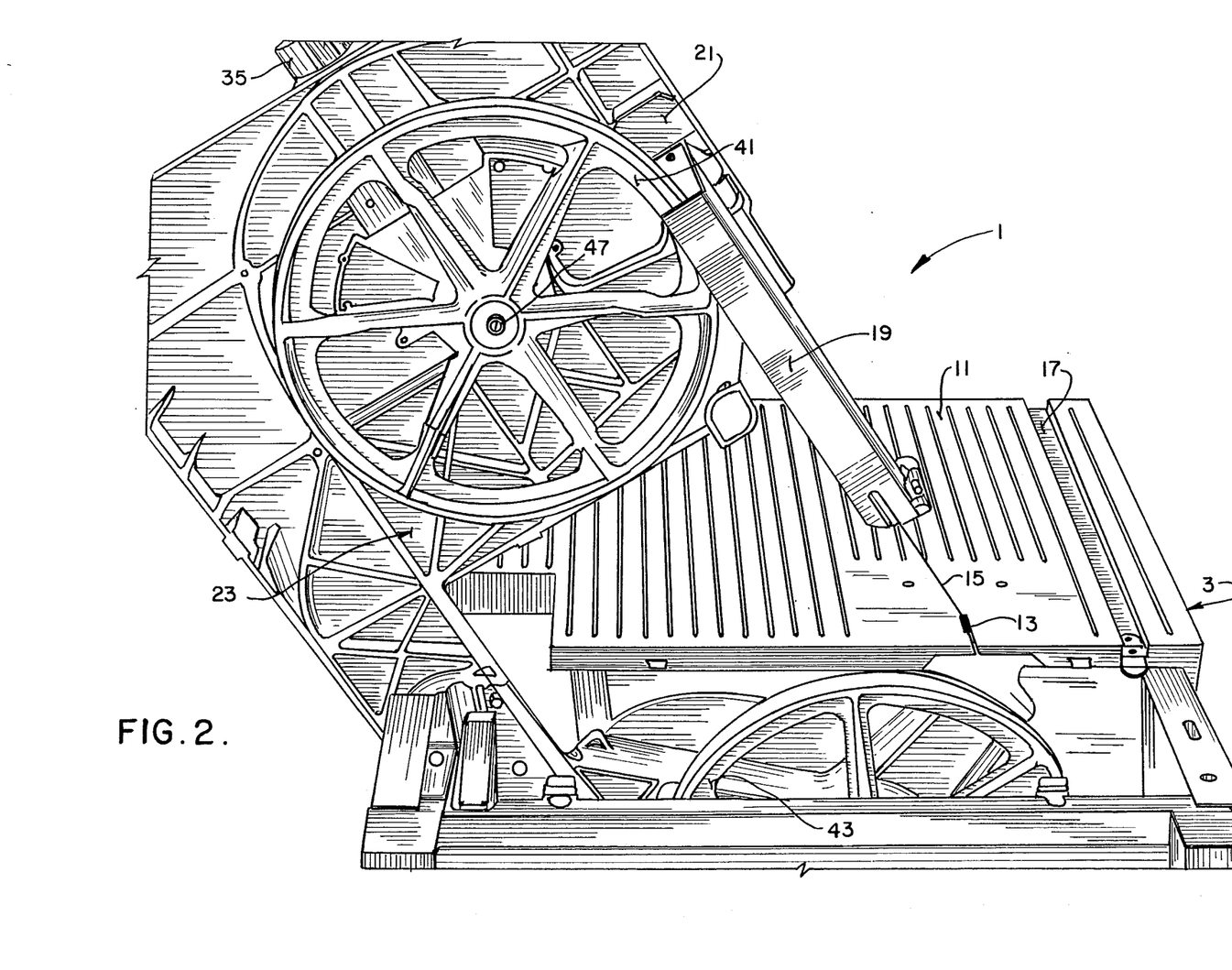
FIG. 2 is a fragmentary isometric view illustrating the manner in which an endless band saw blade is adjustably inclined or tilted relative to a fixed worktable surface of the band saw.

In FIG. 1 of the drawings, the angularly adjustable band saw 1 is shown as including a supporting worktable 3 mounted on a base 4 which is supportive by a series of four worktable legs 5 interconnected by struts 7 adjacent their lower end and by an upper horizontal support 9 that carries the base 4. The worktable 3, mounted on the rectangularly shaped base 4, includes an upper worktable surface 11 and a saw blade slot 13 extending through the worktable surface 11, and through which the endless band saw blade 15 moves, as will become apparent. The upper worktable surface 11 further has a miter gage slot 17 at one end of the worktable 3 for receipt of a miter gage (not shown), for supporting a workpiece (not shown) relative to the endless band saw blade 15. The endless band saw blade 15 has a blade guard 19 which extends from within the housing 21 that surrounds the movable frame or tilting head 23, the blade guard 19 being partially visible at the lower end of the housing 21 in FIG. 1 of the drawings. The angularly adjustable band saw 1 further includes a hand wheel 25 for angularly adjusting/moving the movable frame 23, as will become apparent, and a locking knob 27 which must first be released in order to allow the hand wheel 25 to incline or tilt the movable frame 23, as desired.

At the front of the base 4 of the angularly adjustable band saw 1, in addition to the hand wheel 25 and lock knob 27, is an on/off switch 29 and an electronic/indicator system 31. The electronic/indicator system 31 includes digital read out displays in order to give the user the ability to accurately position the endless band saw blade 15 as desired, while monitoring the set up. The digital read out displays include the blade tension, the blade speed in feet per minute and the angle of the band saw blade 15 relative to the worktable surface 11.

Also shown in FIG. 1 of the drawings is a machine label 33 for designating the name of the manufacturer or distributor and other band saw identifying information, as may be desired. At the top of the housing 21 is tension adjustment knob 35 which controls the amount of tension in the endless band saw 15, as will become apparent.

Reference is now made to FIGS. 2-5 and 10-11 for a description and operation of the specific components providing the angular adjustability in the angularly adjustable band saw 1.

As will be explained in detail below, the movable frame 23, carrying the endless band saw blade 15, is constructed and interconnected to other components of the band saw 1, to provide the desired angular adjustment of the endless band saw blade 15 relative to the worktable surface 11. While the movable frame 23 is movable to any desired angle from 0° to 45°, the worktable surface 11 is maintained in a fixed and generally horizontally extending position, as shown. This provides a large stable work area with the precise angular adjustment desired, as will be more particularly understood below.

Figure 10:
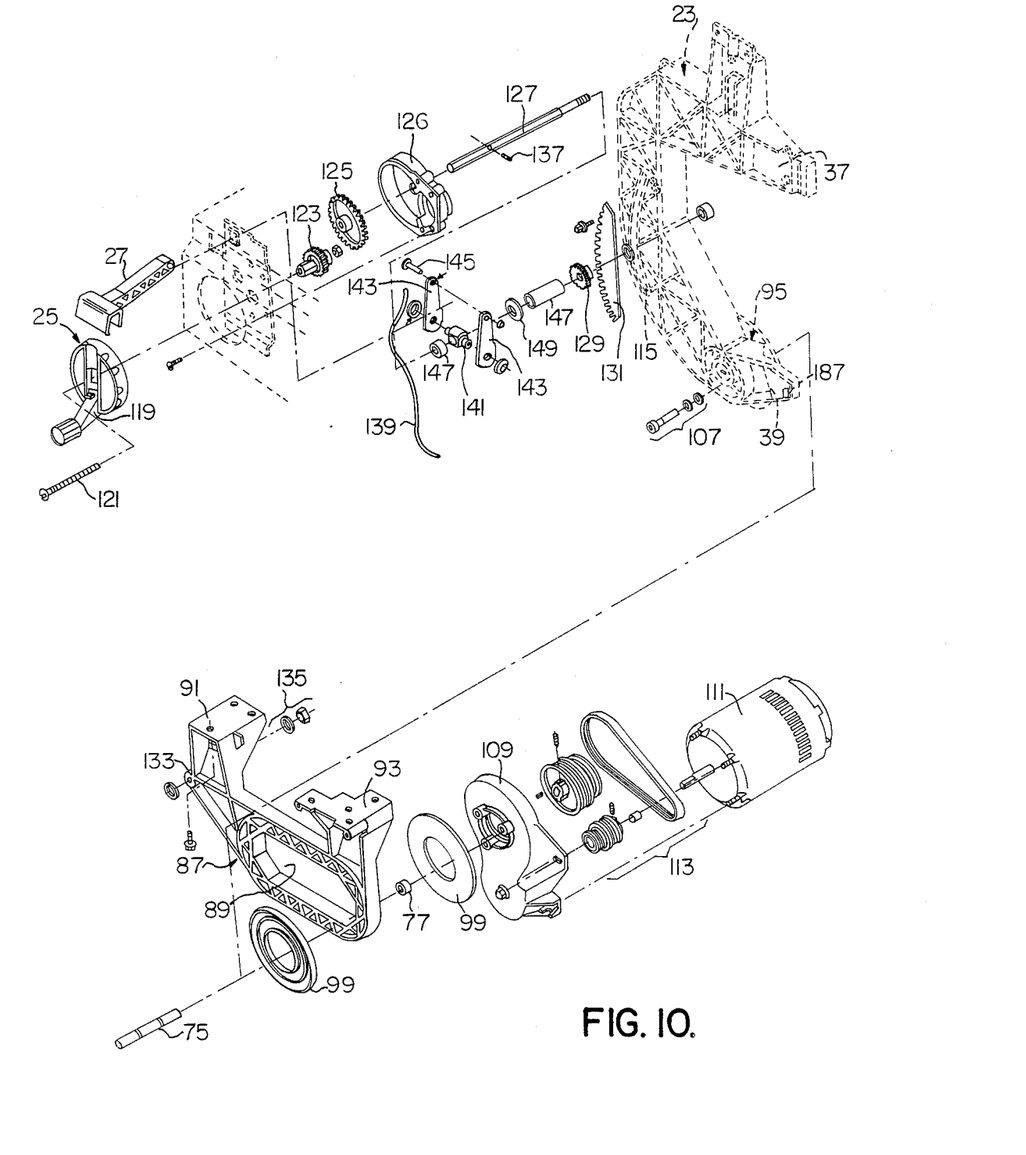
FIG. 10 is an exploded isometric view of the various component parts forming the movable frame and fixed frame support of the angularly adjustable band saw.
Figure 11:
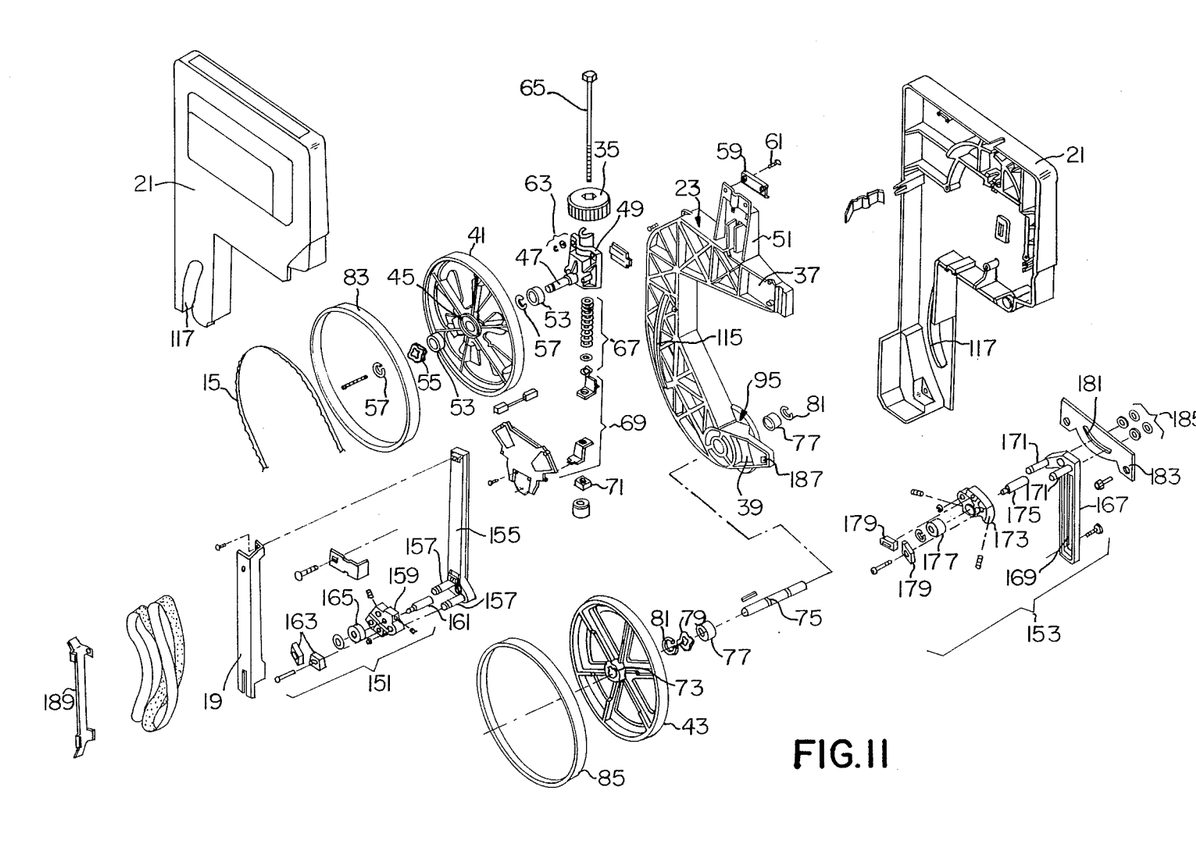
FIG. 11 is also an exploded isometric view illustrating the component parts of the movable frame including associated upper and lower band wheel supporting wheels and upper and lower blade guide supports, in the angularly adjustable band saw of the present invention.

The movable frame 23 is a generally C-shaped frame having interconnected spaced ribs forming a light weight, but rigid construction (See FIGS. 10–11). The generally C-shaped frame of the movable frame 23 includes upper and lower generally parallel legs 37, 39 which mount corresponding upper and lower band saw supporting wheels 41, 43 respectively. The upper leg 37 and corresponding upper band saw supporting wheel 41 is positioned above the worktable surface 11, while the lower leg 39 and corresponding lower band saw supporting wheel 43 extends below the worktable surface 11.

As best shown in FIG. 11 of the drawings, the upper band saw wheel 41 includes a central hub 45 which is positioned over the shaft 47 of the upper wheel support assembly 49, the latter, in turn, being mounted to the integral upstanding channel 51 extending upwardly above the upper leg 37 of the movable frame 23. Suitable ball bearings 53, spring washer 55 and retaining rings 57 are employed for rotatably mounting and securing the upper band saw wheel 41 relative to the upper wheel support assembly 49 and shaft 47 thereof. The upper wheel support assembly 49 is mounted relative to the upper channel support 51 through the backup plate 59 and associated bolts 61 which extend through corresponding openings in the upper wheel support assembly 49 and held thereto by the washer and lock nut assembly 63.

The blade tension knob 35 is also interconnected relative to the upper wheel support assembly 49 through the blade tension screw 65 that extends through an opening in the blade tension knob 35, through the upper wheel support assembly 49, and through a series of springs, and washers 67 for engagement with the actuator and indicator components 69 that are held in place by the nut 71. While the blade tension knob and related components form no part per se of the present invention, it will be understood that the blade tension knob can be tightened to increase the tension on the band saw blade 15 or loosened to decrease the tension on the band saw blade 15.

The lower end supporting wheel 43 also includes a central hub 73 for receiving the lower wheel shaft 75, the latter, in turn extending through an opening in the lower leg 39 of the movable frame 23. Suitable ball bearing 77, washer 79 and retaining ring 81 are employed to mount and hold the lower wheel shaft 75 relative to the lower leg 39 of the movable frame 23, while rotatably supporting the lower band saw supporting wheel 43.

Both of the upper and lower band saw supporting wheels 41, 43, respectively, are provided with endless tires 83, 85 around the circumference thereof, and then the endless band saw blade 15 is positioned around the endless tires 83, 85.

In order to adjust the movable frame 23, including associated endless band saw blade 15, the movable frame 23 is supported by and positioned relative to the frame support 87 and the worktable 3, in order to make the desired angular adjustment of the endless band saw 15 relative to the worktable surface 11, for bevel and/or miter cutting of a workpiece.

As best seen in FIG. 10 of the drawings, the frame support 87 is an elongated body 87 having an elongated channel 89 therein which extends generally parallel to the worktable surface 11. The frame support 87 includes upper spaced worktable flanges 91, 93 having suitable openings therein for receiving bolts to mount same to the worktable 3, below the worktable surface 11, as will be apparent. For cooperative interengagement with the frame support 87, the movable frame 23 includes a complementary shaped element 95 which is integrally formed on the lower leg 39, on an opposite face from the rotatably mounted lower band supporting wheel 43. As shown in the drawings, this integral complementary shaped element 95 is shown in the drawings as a narrow width, generally cylindrically shaped body that is slidably supported within the elongated channel 89 of the frame support 87.

Figure 5:
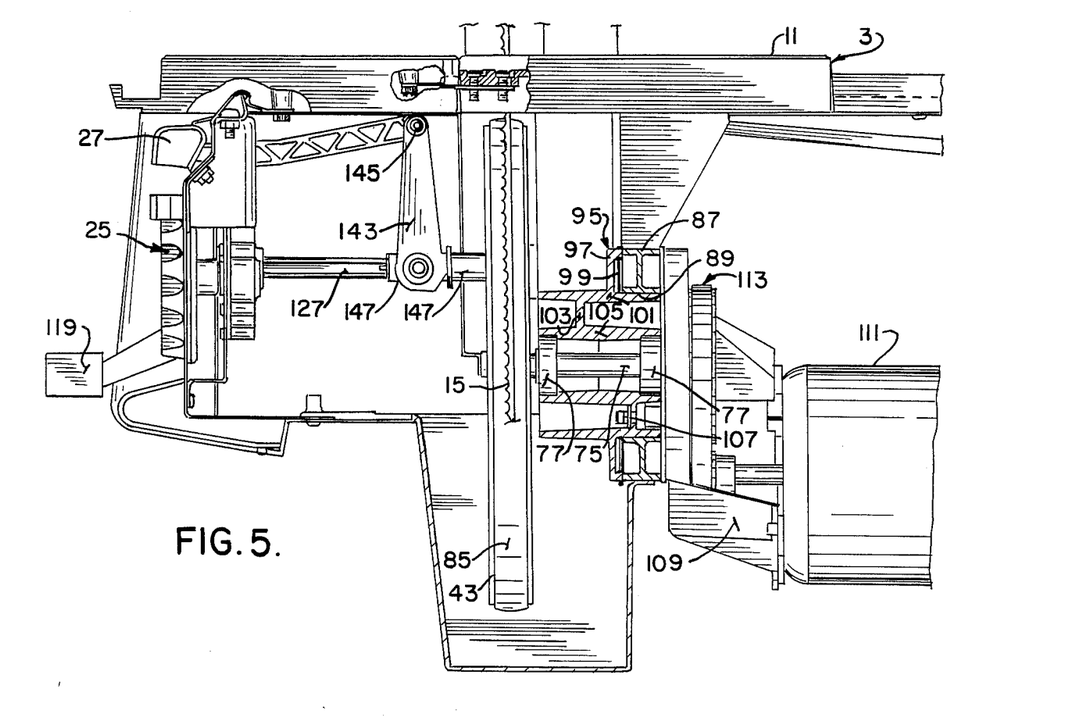
FIG. 5 is a fragmentary side elevational view of the particular area of the band saw illustrated in FIG. 4.

The specific shape of the cylindrically shaped element 95 is best seen in FIG. 5 of the drawings. The cylindrically shaped body 95 includes a circumferentially extending flange 97 that engages a washer 99 interposed between the frame support 87 and the circumferential flange 97. The cylindrically shaped body 95 further includes an outer web wall 101 that is received within the elongated channel 89 of the frame support for slidable support thereof. The outer web wall 101 is interconnected by the transverse radial extending wall section 103 to the hollow inner web wall 105 for receiving the ball bearings 77 that rotatably mount the lower wheel shaft 75, upon which the lower band supporting wheel 43 is mounted. Bolt assemblies 107 extend through circumferentially spaced apertures in the cylindrically shaped element 95 for attaching a motor mount 109 to the movable frame 23, also as best seen in FIG. 5 of the drawings. An electrical motor 111 is bolted to the motor mount 109 and drives a belt and pulley drive 113, as best seen in FIG. 10, for rotatable interconnection relative to the lower wheel shaft 75. Thus, the motor 111, through the belt pulley drive 113, drives the lower rotatable shaft 75 which, in turn, drives the lower band saw supporting wheel 43, to drive the endless band saw blade 15 in an endless path, for the aforementioned cutting operations, as desired.

For angular adjustment of the movable frame 23 relative to the frame support 87 and the worktable surface 11, the movable frame 23 is further provided with a curvilinear elongated slot 115 that is appropriately configured and designed to permit movement of an element within the curvilinear slotted passageway 115, while at the same time permitting unimpeded movement of the complementary shaped element 95 within the elongated channel 89 of the frame support 87. A corresponding slot 117 is formed in each half of the housing 21 as shown in FIG. 11 of the drawings, also to provide sufficient space for free unimpeded movement.

Reference is now made to FIG. 10 of the drawings for a description of the components associated with the hand wheel 25 which cooperates with the curvilinear slotted passageway 115 to move the movable frame 23 to the desired angular or inclined position relative to the worktable surface 11. The hand wheel 25 includes a knob lever 119 for rotatable movement of the hand wheel. A screw 121 extends through the hand wheel 25 and is connected to the hand wheel pinion 123. The hand wheel pinion 123 that engages the hand wheel gear 125 for driving the shaft 127 that is connected thereto. A gear cover 126 rotatably receives the hand wheel pinion 123 and hand wheel gear 125 and is mounted to an inner surface of the base 4 for capturing these components therewithin. The hand wheel shaft 127 receives the drive pinion 129 thereon for driving engagement with the gear segment 131 that is attached by suitable fasteners adjacent the curvilinear slotted passageway 115. The hand wheel shaft 127 also extends through the curvilinear slotted passageway 115 through a corresponding aligned opening 133 in the frame support 87, and then is secured in place by a suitable nut and washer assembly 135. Thus, as the hand wheel 25 is rotated in the given direction, the hand wheel shaft 127 rotates in an opposite direction and rotates the pinion gear 129 in gear driving engagement with the gear segment 131 to incrementally adjust and move the hand wheel shaft 127 within the curvilinear slotted passageway 115. By having the frame support 87 secured through the corresponding aligned opening 133 to the hand wheel shaft 127, the movable frame 23 will be angularly adjusted or inclined relative to the worktable surface 11, as may be desired.

Figure 6:
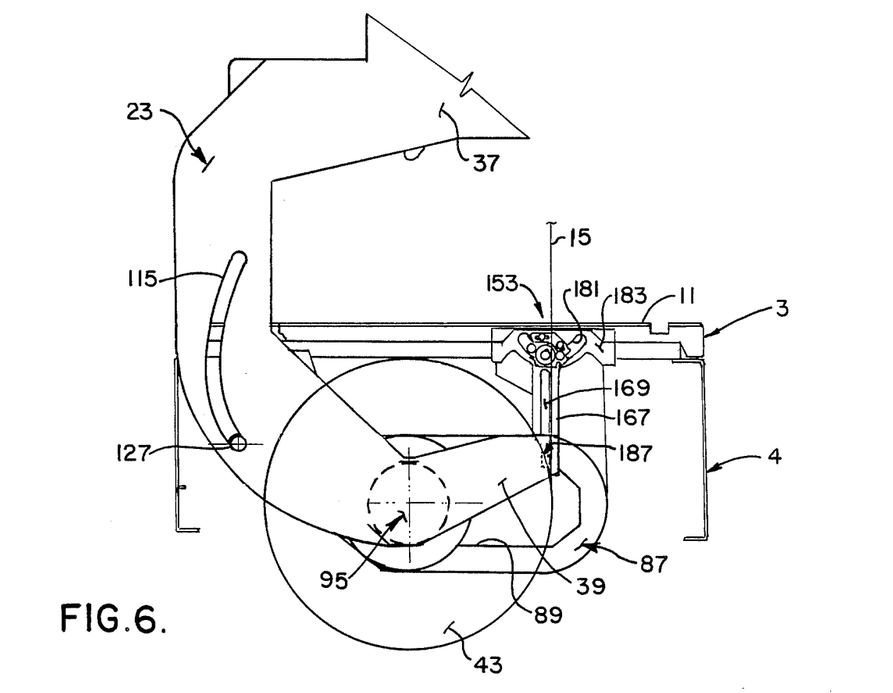
FIG. 6 is a diagrammatic representation of the movable frame relative to the frame support and worktable of the angularly adjustable band saw of the present invention, and illustrating the aforementioned components at 0° inclination.
Figure 7:
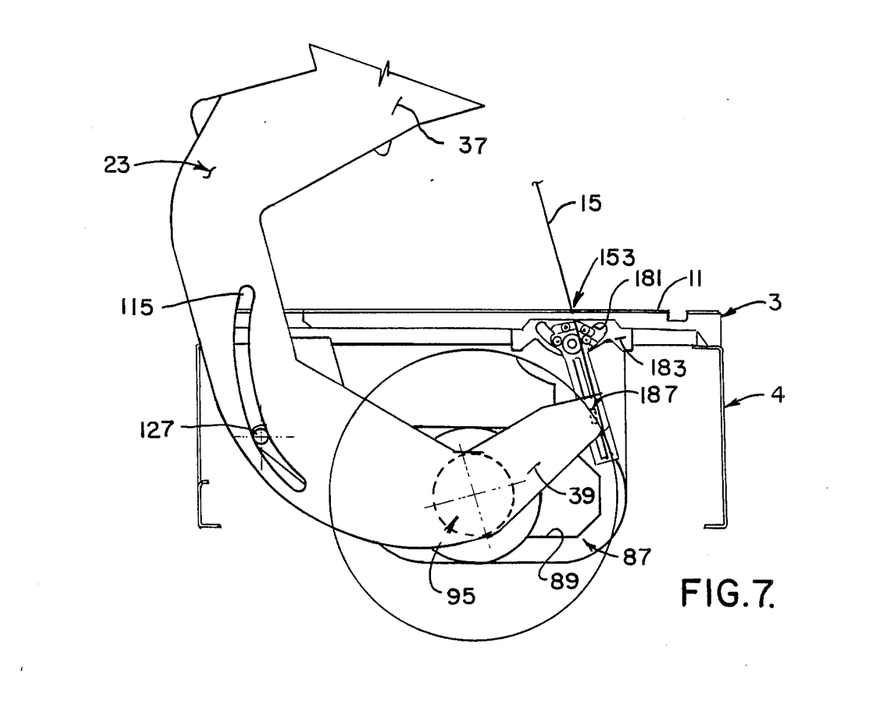
FIG. 7 is a diagrammatic representation of the angularly adjustable band saw with the movable frame at 15° inclination relative to the fixed frame support and worktable components thereof.
Figure 8:
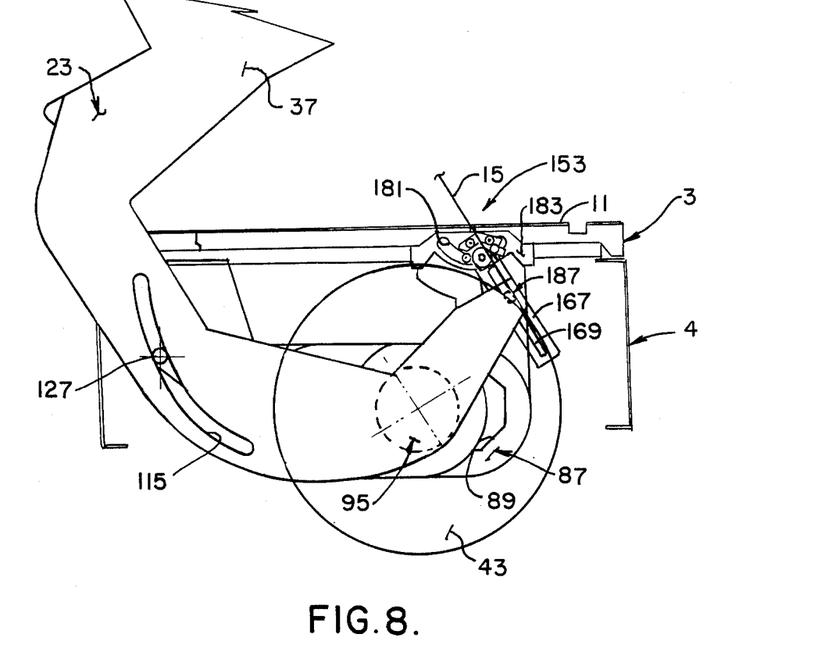
FIG. 8 is a diagrammatic representation of the angularly adjustable band saw with the movable frame at a 30° inclination relative to the fixed frame support and worktable components thereof.
Figure 9:
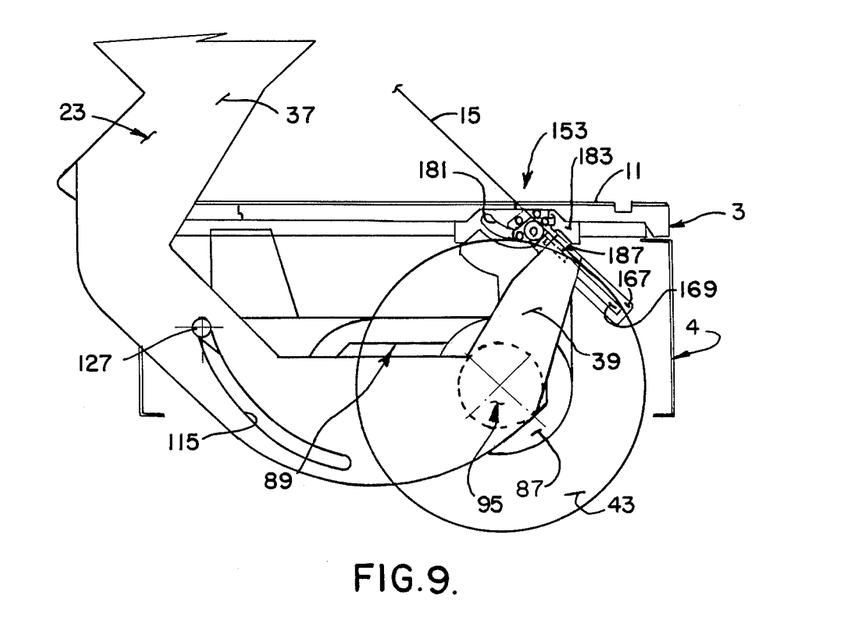
FIG. 9 is a diagrammatic representation of the angularly adjustable band saw with the movable frame at a 45° inclination relative to the fixed frame support and worktable components thereof.

When the desired angular adjustment takes place by the rotation of a hand wheel 25, the relative location of the hand wheel shaft 127 within the curvilinear slotted passageway 115 also determines the relative location of the complementary shaped element 95 of the lower leg 39 of the movable frame 23. This is best seen in FIGS. 6-9 of the drawings, where FIG. 6 shows 0° relative position, FIG. 7 shows 15° angular adjustment, FIG. 8 shows 30° angular adjustment and FIG. 9 shows 45° angular adjustment of the movable frame 23 relative to the worktable surface 11. As the hand wheel 25 is rotated, the hand wheel shaft 127 moves the pinion gear 129 which incrementally moves the gear segment 131 respectively within the curvilinear slotted passageway 115, causing the movable frame 23 to tilt at the various angles illustrated in FIGS. 7-9 of the drawings from the FIG. 6 0° position where the band saw blade 15 extends perpendicular to the worktable surface 11. As the hand wheel shaft 127 moves upwardly in the curvilinear slotted passageway 115, as shown in FIGS. 7-9 of the drawings, the movable frame 23, as the result of the interconnection relative to the frame support 87, will cause the complementary shaped element 95 of the movable frame 23 to move from the left side to the right side of the elongated channel 89 of the frame support 87, while the complementary shaped element 95 is slidably supported within the elongated channel 89. As a result, the movable frame 23 will be precisely and incrementally adjusted at various angular positions from 0° to 45° relative to the worktable surface 11 while, at the same time, being slidably supported relative to the frame support 87 and the worktable 3.

In order to releasably lock and hold the hand wheel shaft 127 in the desired angular position, and to permit subsequent movement thereof as desired, a locking knob 27 is provided. As shown in FIG. 10, the locking knob 27 cooperates with the locking mechanism 139 that is also mounted on the hand wheel shaft 127 between pin 137 and the pinion gear 129. Specifically, the locking mechanism 139 includes a locking mount 141 having spaced locking cams 143 that are pinned at 145 to the lock knob 27, through an opening at the free end thereof. The locking mechanism 139 further includes spacers 147 and a washer 149 also mounted on the hand wheel shaft 127, in the position illustrated in FIG. 10 of the drawings. When it is desired to disengage the locking knob 27 and locking mechanism 139 from the hand wheel shaft 127, the locking knob 27 is pulled outwardly from the worktable causing the cam locks 143, 143 to rotate the lock mount 141, which serves to provide a spaced openings between the spacers 147 and the other components of the locking mechanism 139, enabling the hand wheel shaft 127 to be rotated by the hand wheel 25, for movement of the hand wheel shaft 127 within the curvilinear slotted passageway 115 as described above. By reversing the movement of the locking knob 27, the lock mount 141 will be moved by the cam locks 143 to close any openings between the spacers 147 or other components of the locking mechanism 139, thereby locking and holding the hand wheel shaft 127 in the desired location within the curvilinear slotted passageway 115.

Figure 3:
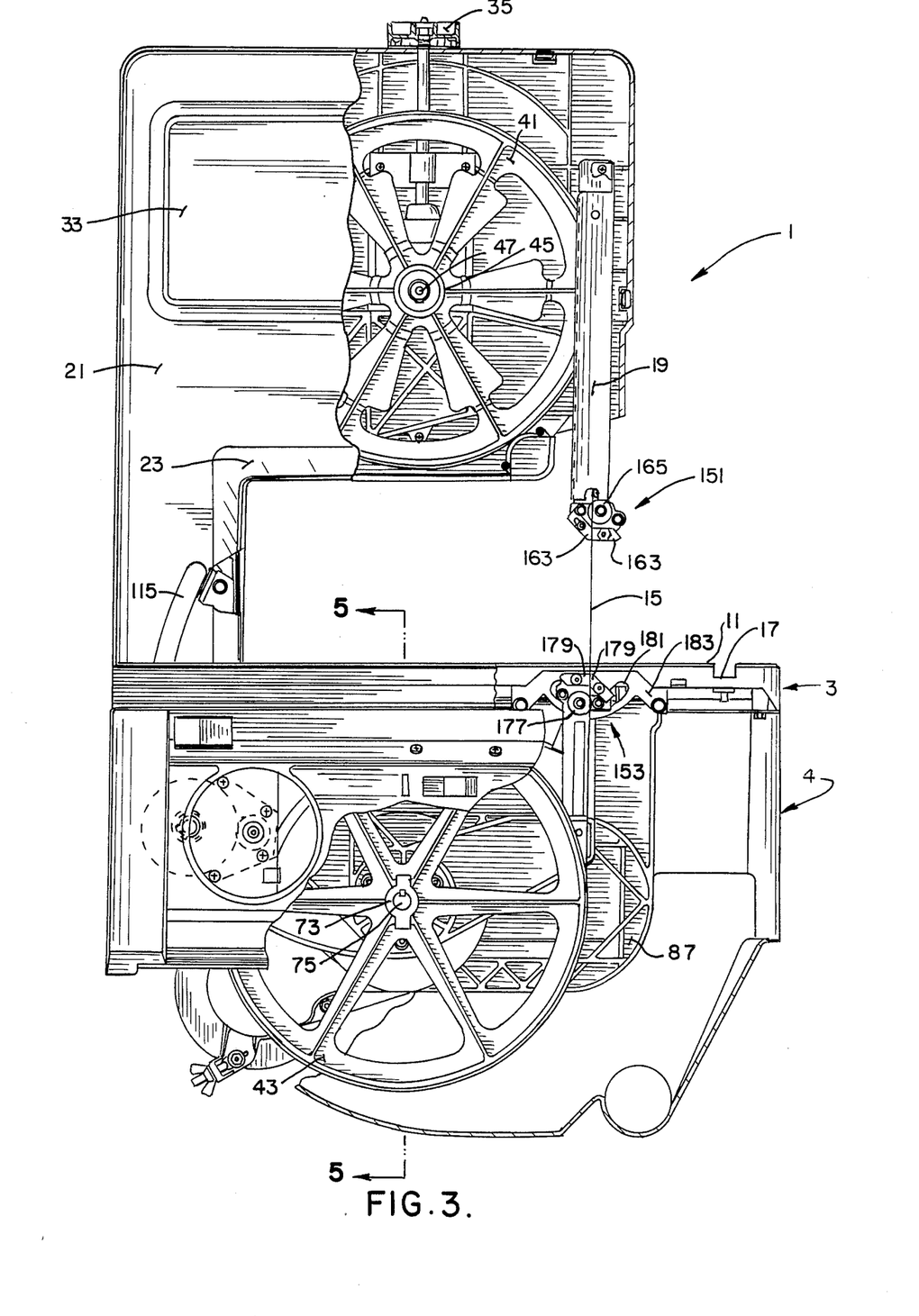
FIG. 3 is a fragmentary front elevational view of the angularly adjustable band saw of the present invention which illustrates the principal operating components of the band saw.
Figure 4:
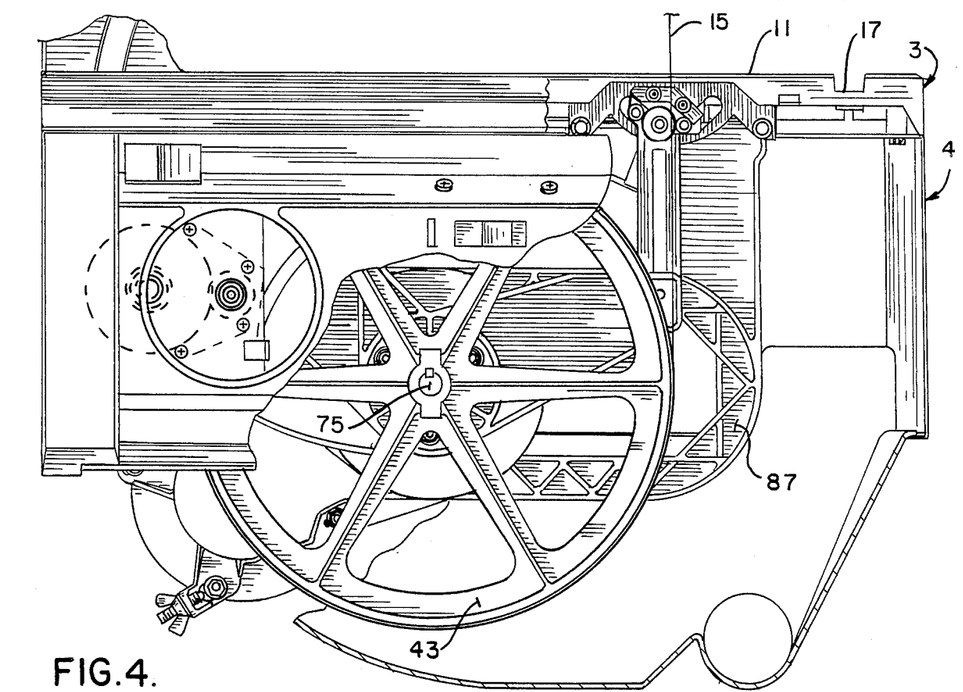
FIG. 4 is a fragmentary front elevational view illustrating components of the angularly adjustable band saw mounted below the worktable surface thereof.

As best seen in FIG. 3 and 11 of the drawings, the angularly adjustable band saw 1 is further equipped with upper and lower blade guide supports 151, 153 that are correspondingly positioned above and below the worktable surface 11 to support the endless band saw blade 15 and keep it from twisting during operation. The upper blade guide support 151 includes an elongated bar 155 that is attached to the upper leg 37 of the movable frame 23 and supports the blade guard 19 thereon. Spaced supporting shafts 157, 157 are mounted at the lower end of the elongated bar 155 and receive the guide support 159, with the bearing support shaft 161 also extending through the guide support 159. The spaced blade guides 163, 163 are mounted on the guide support 159, while the ball bearing 165 is rotatably mounted on the bearing support shaft 161. The spaced blade guide 163, 163 are positioned close to, but spaced from the endless band saw blade 15, while the back up bearing 165 supports the endless band saw blade 15 from the rear and will spin when the blade 15 is pushed against it during the cutting operation. When cutting is stopped, the bearing 165 also stops spinning.

The lower blade guide support 153 includes an elongated generally vertically oriented slide member 167 having a corresponding elongated opening 169 therein. At the upper end of the slide member 167 are a pair of spaced shafts 171, 171 that receive the guide support 173, with the bearing support shaft 175 also extending through the guide support 173 for receiving the ball bearing 177. The blade guides 179, 179 are mounted to the guide support 173 along with the ball bearing 177, for guiding the endless band saw blade 15 without twisting during the cutting operation, in the same manner as the upper blade guide support 151.

The lower blade guide support 153 is different from the upper blade guide support 151 in that the slide member 167 is constructed to slidably pivot and move relative to the curvilinear opening 181 in the trunnion 183 that is mounted to the frame support 87 below the worktable surface 11. The spaced shafts 171, 171 include a rear extension (not shown) that extends through the curvilinear opening 181 so as to be held in place relative to the trunnion 183 by the push nut and washer assemblies 185. Thus, the vertically oriented slide member 167 is constructed for slidable pivoting movement relative to the curvilinear opening 181 of the trunnion 183 that is fixed to the frame support 87 below the worktable surface 11.

The elongated opening 169 in the slide member 167 is also constructed to cooperate with a complementary shaped abutment or boss 187 that is formed on the lower leg 39 of the movable frame tilt head 23. Specifically, the rectangularly shaped abutment or boss 187 is formed on the lower leg 39 of the movable frame 23 adjacent the complementary shaped element 95, but on an opposite face from that shown in both FIGS. 10–11 of the drawings. This rectangularly shaped abutment or boss 187 is constructed to be complementary shaped relative to the elongated opening 169 in the slide member 167, thereby causing the slide member 167 to slidably pivot within the curvilinear opening 181 of the trunnion 183, as the movable frame 23 is moved in the various angular positions as shown in FIGS. 6–9 of the drawings. In these Figures, it will be seen that the rectangularly shaped abutment or boss 187 of the lower leg 39 is moved from a lower to an upper position as the movable frame 23 is moved from a 0° to 45° angular position relative to the worktable surface. This causes the slide member 167 to be correspondingly angularly moved relative to the movable frame 23, in order to maintain the upper and lower blade guide supports 151, 153 in corresponding aligned relationship to each other and in the same relative position with respect to the endless band saw blade 15, regardless of the angular position of the movable frame 23, as will now be appreciated.

In order to convert the angularly adjustable band saw 1 into a sander, the endless band saw blade 15 is removed and the sanding platen 189 is inserted into the blade slot 13 in the worktable surface 11 and fastened to the upper blade guide support 151 near the right blade guide 163 mount. The upper left blade guide 163 is then slid towards the sanding platen 189 and is securely mounted to the sanding platen 189, while the lower left blade guide 179 is similarly mounted relative to the sanding platen 189. The sanding belt 191 may then be installed over the upper and lower band saw supporting wheels 41, 43 respectively, with tension adjusted as necessary for the desired sanding action that is contemplated.

From the foregoing, it will be appreciated that the angularly adjustable band saw of the present invention enables the endless band saw blade to be moved at various angles from 0° to 45° relative to a level worktable surface. The movable frame, including the associated endless band saw blade, may be adjusted by the hand wheel relative to the frame support and worktable to provide the desired angular adjustment of the endless band saw blade relative to the worktable surface for bevel and/or miter cutting of a workpiece. As the movable frame is adjusted relative to the frame support and worktable, the point of intersection of the endless band saw blade relative to the table remains the same, that is, there is no change in the point of intersection of the endless band saw blade relative to the worktable. This has been accomplished by having the movable frame, containing both the upper and lower band saw supporting wheels and associated endless band saw blade, to move relative to the frame support and worktable. Incremental adjustment of the movable frame relative to the frame support and worktable is also provided by the cooperating interengaging gear pinion and gear segments, as described. The spaced cooperating control of the movable frame relative to the frame support and worktable, is the result of the slidably mounted and supported element of the movable frame moving within the support frame, while the hand wheel shaft is positioned at various locations within the curvilinear slotted passageway of the movable frame, for precise and incremental inclined or tilting movement of the movable frame relative to the frame support and worktable. In addition, upper and lower blade guide supports are constructed and arranged to move along with the movable frame to provide corresponding alignment of the upper and lower blade guide supports relative to one another into the movable frame and worktable during tilting movement, as described. Quick convertibility of the apparatus of the band saw to a sander may also be provided, if desired.

In view of the above, it will be seen that the several objects of the invention are achieved and other advantageous results are obtained.

As various changes could be made in the above construction without departing from the scope of the invention, it is intended that all matter contained in the above description or shown in the accompanying drawings shall be interpreted as illustrative and not in a limiting sense.

We claim:

1. A band saw comprising:
   a supporting worktable having a worktable surface on which a workpiece rests and a saw blade slot extending through the worktable surface;
   a frame support fixed to the worktable below the worktable surface and having an elongated channel in said frame support extending generally parallel to said worktable surface;
   a movable generally C-shaped frame having upper and lower generally parallel legs with corresponding upper and lower band saw supporting wheels rotatably mounted on said upper and lower legs, said upper leg and upper band saw supporting wheels being positioned above said worktable surface, said lower leg and lower band saw supporting wheel extending below said worktable surface and having a complementary shaped element slidably supported within the elongated channel of said frame support;
   said lower band saw supporting wheel having a rotatable shaft in alignment with and extending through the complementary shaped element of said C-shaped frame lower leg;
   motor means mounted to said C-shaped frame on an opposite side of said frame support from said lower rotating band saw supporting wheel and being connected to the rotatable shaft of said lower band saw supporting wheel;
   an endless band saw blade mounted for movement about said upper and lower band saw supporting wheels including through the saw blade slot in the worktable surface; and
   adjustment means for tilting said C-shaped frame including the band saw blade mounted on said upper and lower band saw supporting wheels relative to said worktable surface, said adjustment means during tilting movement thereof causing the complementary shaped slidable supporting element on the lower leg of said C-shaped frame to move in the elongated channel of said frame support to provide the desired angular adjustment of the saw blade relative to the worktable surface without changing the point of intersection of the saw blade relative to the worktable surface.

2. The band saw as defined in claim 1 wherein said adjustment means includes a hand wheel rotatably mounted to said worktable which is connected to said C-shaped frame and frame support for tilting movement of said C-shaped frame and sliding movement of said complementary shaped surface thereof within the elongated channel of said frame support.

3. The band saw as defined in claim 2 including a shaft connected to said hand wheel and extending through an opening in said frame support and then through a curvilinear slotted passageway in said C- shaped frame, the rotation of said hand wheel causing said hand wheel shaft to be located at various positions within said curvilinear slotted passageway in affording tilting movement of said C-shaped frame and sliding movement of said complementary surface within the elongated channel of said frame support.

4. The band saw as defined in claim 3 and including a gear segment mounted adjacent said curvilinear slotted passageway for cooperating engagement with a pinion gear mounted on said shaft and providing incremental angular adjustment.

5. The band saw as defined in claim 4 including a hand wheel gear mounted on said bevel shaft and a hand wheel pinion mounted to a hand wheel shaft connected to said hand wheel.

6. The band saw as defined in claim 5 including a bevel lock knob for releasable engagement with said frame support to permit said aforesaid angular support adjustment when disengaged from said frame.

7. The band saw as defined in claim 1 wherein said motor means includes a motor mount connected to said movable frame through the elongated channel of said frame support, and a motor secured to said motor mount and interconnected to the rotatable shaft of said lower band saw supporting wheel for driving same.

8. The band saw as defined in claim 7 and including a pulley drive connected between said motor and the rotatable shaft of said lower band saw supporting wheel.

9. The band saw as defined in claim 1 including an upper blade guide support mounted on the upper leg of said C-frame and a lower blade guide support pivotally mounted to the worktable below the worktable surface, the lower leg of said C-frame being connected to the lower blade guide support for pivotal movement thereof and corresponding alignment relative to the upper blade guide support during the aforementioned tilting movement of said C-frame.

10. The band saw as defined in claim 9 wherein said lower blade guide support includes a trunnion fixed to the frame support below the worktable surface, a curvilinear opening in said trunnion for slidable pivoting movement of an elongated generally vertically oriented slide member having an elongated opening therein, the lower leg of said C-frame having a slide portion for slidable movement within the elongated opening of said elongated generally vertical oriented slide member during tilting movement of said C-frame causing angular movement of said slide member through slidable pivoting movement thereof.

11. The band saw as defined in claim 9 wherein said frame support includes a corresponding curvilinear opening aligned with the curvilinear opening in said trunnion to provide free unimpeded movement of said elongated generally vertically oriented slide member.

12. The band saw as defined in claim 11 wherein each of said upper and lower blade guide supports include opposing blade guide surfaces spaced from the band saw blade to provide free running movement without twisting of the blade and a rotatably mounted back-up bearing for engaging the band saw blade rear surface during cutting.

13. A band saw comprising:
a supporting worktable having a worktable surface on which a workpiece rests and a saw blade slot extending through the worktable surface;
a frame support fixed to the worktable below the worktable surface and having an elongated channel in said frame support extending generally parallel to said worktable surface;
a movable generally C-shaped frame having upper and lower generally parallel legs with corresponding upper and lower band saw supporting wheels rotatably mounted on said upper and lower legs, said upper leg and upper band saw supporting wheel being positioned above said worktable surface, said lower leg and lower band saw supporting wheel extending below said worktable surface and having a complementary shaped slidably supported element within the elongated channel of said frame support for tilting movement of said C-frame relative to said worktable said complementary shaped slidably supported element also being slidably supported against said frame support;
said lower band saw supporting wheel having a rotatable shaft in alignment with and extending through the complementary shaped element of said C-shaped frame lower leg;
motor means mounted to said C-shaped frame on an opposite side of said frame support from said lower rotating band saw supporting wheel and being connected to the rotatable shaft of said lower band saw supporting wheel;
an endless band saw blade mounted for movement about said upper and lower band saw supporting wheels including through the saw blade slot in the worktable surface;
upper and lower blade guide supports positioned above and below the worktable surface, the upper blade guide support mounted on the upper leg of said C-shaped frame and the lower blade guide support being slidably pivotally mounted to the worktable, the lower leg of said C-frame being connected to the lower blade guide support for pivotal movement thereof and corresponding alignment relative to the upper blade guide support during tilting movement of said C-shaped frame; and
incremental adjustment means for incremental tilting of said C-frame including the band saw mounted on said upper and lower band saw supporting wheels relative to said worktable surface, said adjustment means during tilting movement thereof causing the complementary shaped slidable supporting element on the lower leg of said C-shaped frame to move in the elongated channel of said frame support to provide the desired angular adjustment of the saw blade relative to the worktable surface.

14. A band saw comprising:
a supporting worktable having a worktable surface on which a workpiece rests and a saw blade slot extending through the worktable surface;
a frame support fixed to the worktable below the worktable surface;
a movable frame having an upper band saw supporting wheel positioned above the worktable surface and a lower band saw supporting wheel positioned below the worktable surface;
an endless band saw blade mounted for movement about said upper and lower band saw supporting wheels including through the saw blade slot in the worktable surface;
means for driving one of said saw blade supporting wheels to operate said endless blade saw; and
adjustment means for adjusting said movable frame including associated endless band saw blade relative to said frame support and worktable while maintaining the same point of intersection of the saw blade relative to the fixed worktable surface, in order to provide the desired angular adjustment of said endless band saw blade relative to said worktable surface for bevel and/or miter cutting of a workpiece; said adjustment means including cooperating control means a complementary shaped element of said movable frame slidably supported within an elongated channel of said frame support, said elongated channel being generally parallel to said worktable surface, and said movable frame further having a curvilinear slotted passageway spaced from said complementary shaped element and receiving a shaft connected to said worktable, said shaft being positioned at various locations within said curvilinear slotted passageway in affording tilting movement of said movable frame and sliding movement of said complementary shaped surface thereof within the elongated channel of said frame support.

15. The band saw as defined in claim 14 and including a gear segment mounted adjacent said curvilinear slotted passageway for cooperating engagement with a pinion gear mounted on said shaft for incremental angular adjustment.

16. The band saw as defined in claim 14 and including upper and lower blade guide supports mounted on said movable frame above and below the worktable surface, the lower blade guide support being slidably pivotally mounted to the worktable, and said movable frame being connected to said lower blade guide support for slidable pivotal movement, thereby enabling corresponding movement and alignment of the upper and lower blade guide supports relative to one another and to said movable frame and worktable during tilting movement of said movable frame relative to said worktable surface and said frame support.

17. The band saw as defined in claim 16 wherein said lower blade guide support includes a trunnion fixed to the worktable below the worktable surface, a curvilinear opening in said trunnion for slidable pivoting movement of an elongated generally vertically oriented slide member having an elongated opening therein, said movable frame having a slide portion for slidable movement within the elongated opening of said elongated generally vertically oriented slide member during tilting movement of said movable frame and thereby causing angular movement of said slide member through slidable pivoting movement thereof.

* * * * *

UNITED STATES PATENT AND TRADEMARK OFFICE
CERTIFICATE OF CORRECTION

PATENT NO. : 4,882,962

DATED : November 28, 1989

INVENTOR(S) : Daniel A. Terpstra & Steven H. Plume

It is certified that error appears in the above-identified patent and that said Letters Patent is hereby corrected as shown below:

Title page:

Abstract, line 3 is "workable"
     Should be -- worktable --;

Claim 14, Column 13, Lines 7 & 8 is "including cooperating control means a complementary"
     Should be -- including a complementary --.

Signed and Sealed this

Ninth Day of April, 1991

Attest:

HARRY F. MANBECK, JR.

*Attesting Officer*    *Commissioner of Patents and Trademarks*